United States Patent

[15] 3,648,362
[45] Mar. 14, 1972

Oshima et al.

[54] METHOD FOR PRODUCING A MEMORY MATRIX

[72] Inventors: Shintaro Oshima; Toshihiko Kobayashi, both of Tokyo-to, Japan

[73] Assignee: Kokusai Denshin Denwa Kabushiki Kaisha, Tokyo-to, Japan

[22] Filed: July 7, 1969

[21] Appl. No.: 839,404

[30] Foreign Application Priority Data

July 10, 1968 Japan....................................43/47829

[52] U.S. Cl...................................29/604, 29/625, 117/235, 156/237, 156/249, 340/174 PW, 340/174 TF, 340/174 BL

[51] Int. Cl...........................................................H01f 7/06

[58] Field of Search....................29/604, 625; 156/150, 151, 156/230, 233, 237, 247, 249; 340/174, 174 PW, 174 TF, 174 BC; 117/122, 235, 236, 237, 240

[56] References Cited

UNITED STATES PATENTS

| | | | |
|---|---|---|---|
| 3,456,250 | 7/1969 | Barcaro et al. | 340/174 |
| 3,471,836 | 10/1969 | Smith et al. | 29/604 |
| 2,984,597 | 5/1961 | Hennes | 156/237 |

*Primary Examiner*—John F. Campbell
*Assistant Examiner*—Carl E. Hall
*Attorney*—Robert E. Burns and Emmanuel J. Lobato

[57] ABSTRACT

A method for producing a memory matrix having a number of magnetic parallel lines and with magnetic flux keepers and a number of magnetic parallel memory lines each comprising a conductive line and two series-coupled ferromagnetic films deposited on the conductive line so as to form a closed-magnetic circuit around the conductive line. One of the two ferromagnetic films is deposited on the conductive line adhered on a flexible, insulative sheet by a solventproof adhesive so as to produce magnetic parallel lines. The magnetic parallel lines are transferred to the surface of a substratum on the surface of which is a strong adhesive stronger than the solventproof adhesive. The other of the two ferromagnetic films is deposited on the conductive liens of the magnetic parallel lines so as to produce magnetic parallel memory lines. A product of the second step is associated with a product of the third step so that parallel lines of two groups are insulated and intersect each other substantially at 90°.

2 Claims, 15 Drawing Figures

METHOD FOR PRODUCING A MEMORY MATRIX

This invention relates to methods for producing a memory matrix plane using ferromagnetic thin films.

There have been proposed many kinds of memory matrix planes of this type using ferromagnetic thin films produced by evaporative deposition or electrical plating, since the construction of the memory matrix plane is generally suitable to miniaturize the dimension of each memory cell so as to realize a memory of high bit density. On the other hand, the smaller the dimension of each memory cell becomes, the larger the effect of a demagnetizing field on the ferromagnetic film of each memory cell becomes. Therefore, elimination of the effects of a demagnetizing field is an important problem in constructing a miniaturized memory matrix plane of high bit density. However, it is very difficult in a miniaturized memory cell to reduce effectively the effects of a demagnetizing field.

An object of this invention is to provide a method of producing a miniaturized memory matrix plane of high bit density.

The principle of this invention and other objects of this invention will be better understood from the following more detailed discussion taken in conjunction with the accompanying drawings, in which the same or equivalent parts are designated by the same reference numerals, characters and symbols, and in which.

Figures 1A, 1B, 1C, 1D, 1E:
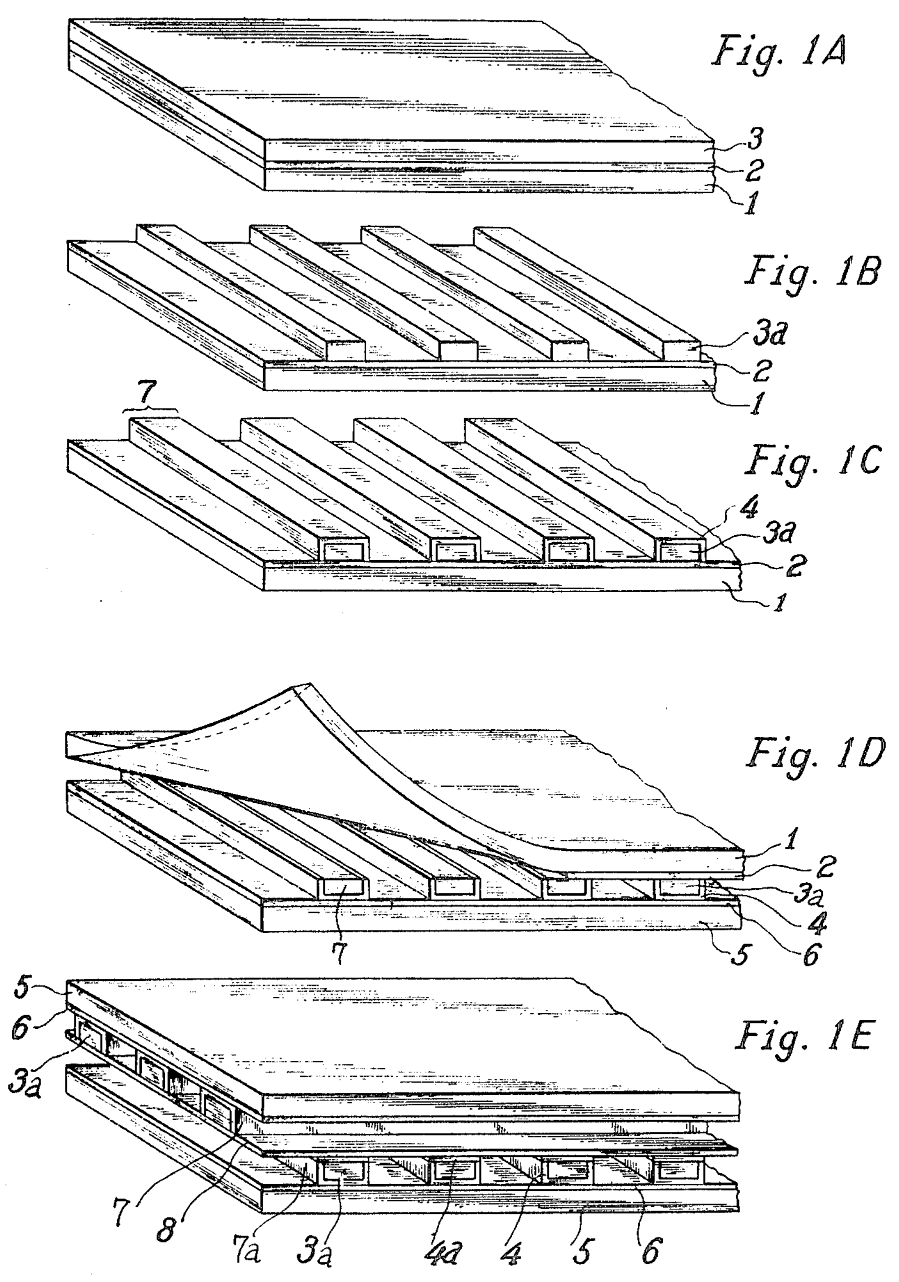
FIGS. 1A, 1B, 1C, 1D and 1E are fragmental perspective views explanatory of an example of the method of this invention.

An example of this invention will now be described with reference to FIGS. 1A, 1B, 1C and 1D. In this example a conductive film 3, such as a copper foil of the thickness 5$\mu$, is deposited on a flexible, insulative sheet 1, such as a plastic sheet, by the use of a solventproof adhesive 2, such as a masking tape of electrical plating, as shown in FIG. 1A. The conductive film 3 is divided into a plurality of parallel lines **3*a* as shown in FIG. 1B by the use of microprocessing technique, such as photoetching. In this case, the width of the parallel lines 3*a* and the space between two adjacent parallel lines 3*a* can be readily processed to about 0.05 and 0.1 millimeters respectively. On each of the parallel lines 3*a*, a ferromagnetic thin film 4 is deposited by electrical plating so that magnetic parallel lines 7 are constructed on the flexible, insulative sheet 1. On the other hand, a strong adhesive 6 is applied on an insulative substratum 5 having a smooth surface, such as glass plate. The adhesive property of this adhesive 6 is stronger than the solventproof adhesive 2. The surface of the flexible, insulative sheet 1 on which the magnetic parallel lines 7 are adhered is pressed against the surface of the insulative substratum 5 on the surface of which the strong adhesive 6 is applied. Thereafter, the flexible, insulative sheet 1 is stripped off. In this case, since the adhesive property of the strong adhesive 6 is stronger than the solventproof adhesive 2, the magnetic parallel lines 7 are transferred to the surface of the substratum 5 on the surface of which the strong adhesive 6 is applied. Therefore, a second ferromagnetic film 4*a* is deposited on each of the parallel small lines 3*a* so as to produce a series coupled magnetic-closed circuit around each of the parallel small lines 3*a* by the first ferromagnetic film 4 and the second ferromagnetic film 4*a***. This deposition is performed by electrical plating by way of example. In accordance with the above-mentioned processes, a memory plate can be produced.

A memory matrix plane can be readily fabricated by the use of the memory plate made as mentioned above and a plate of driving lines illustrated in FIG. 1D. In this case, two plates are associated after inserting an insulative layer 8, such as an insulative paint layer or a thin plastic sheet etc., as shown in FIG. 1E, so that the parallel lines **3*a* having magnetic flux keepers 4 of the plate of driving lines and the parallel lines 3*a*** of the memory plate are intersected substantially perpendicularly. Two plates associated as mentioned above are fixed to each other utilizing preferred bonding techniques.

Figures 2A, 2B, 2C, 2D, 2E:
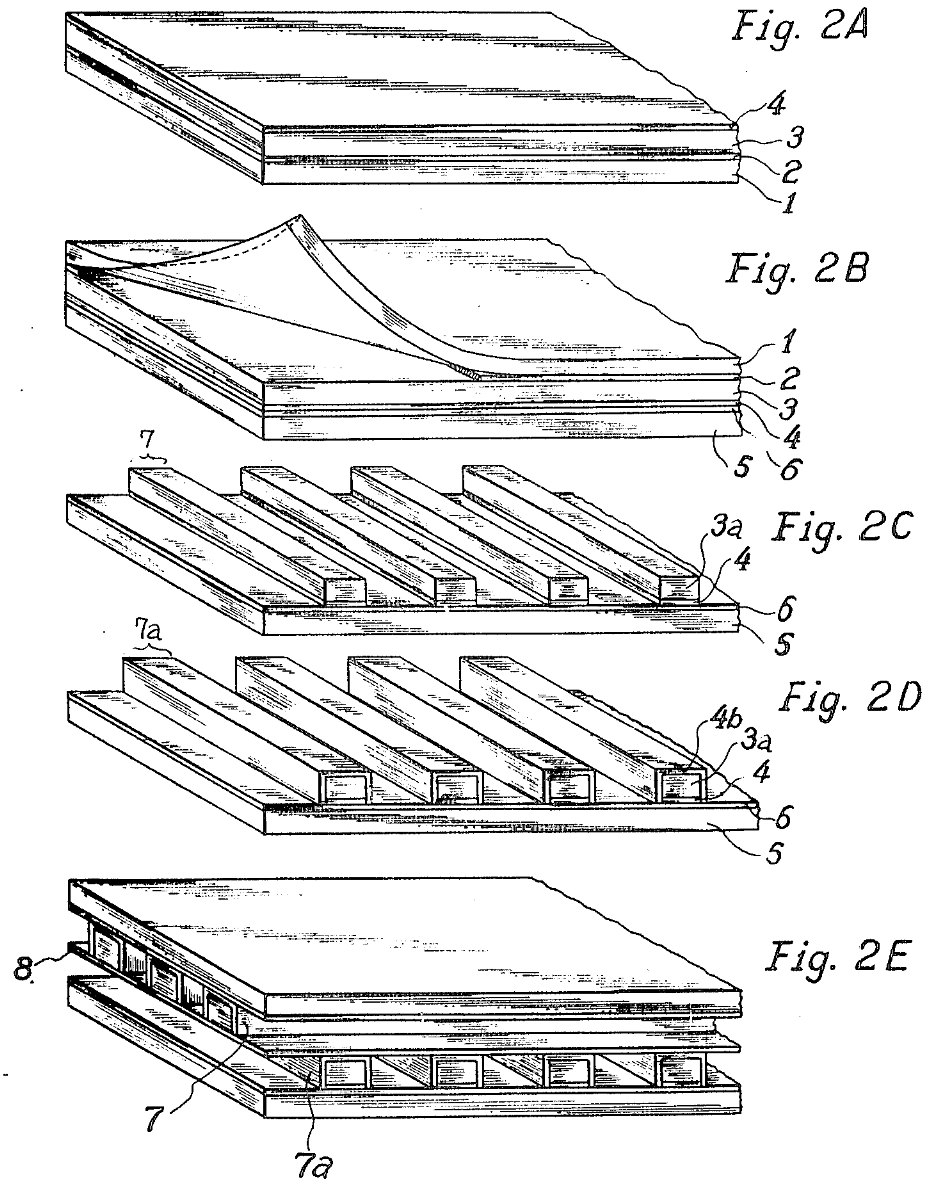
FIGS. 2A, 2B, 2C, 2D and 2E are fragmentary perspective views explanatory of another example of the method of this invention.
Figures 3A, 3B, 3C, 3D, 3E:
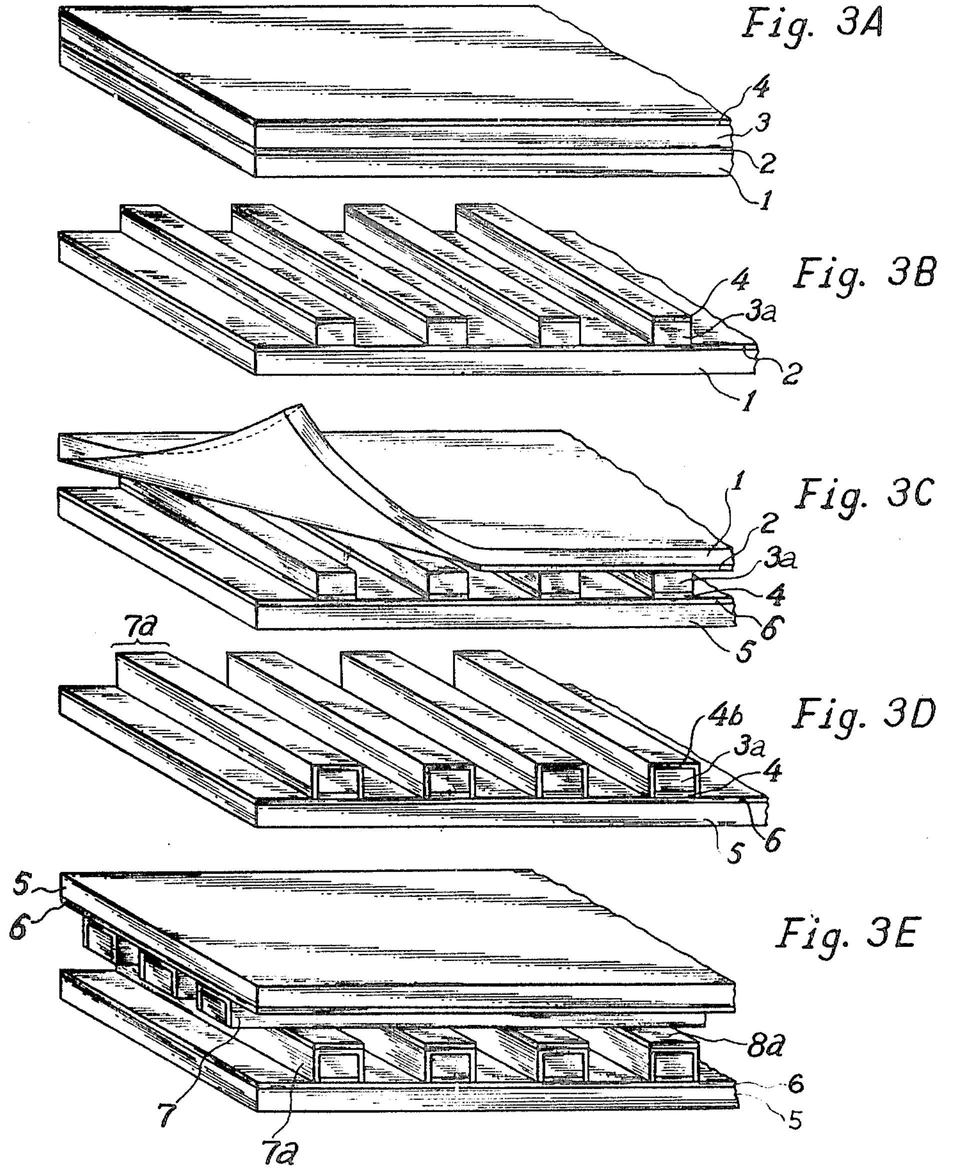
FIGS. 3A, 3B, 3C, 3D and 3E are fragmentary perspective views explanatory of a further example of the method of this invention.

Another example of this invention will be described with reference to FIGS. 2A to 2D. In this example, the conductive film 3 is deposited on the flexible, insulative sheet 1 by the use of the solventproof adhesive 2, and the first ferromagnetic film 4 is uniformly plated on the conductive film 3 by electrical plating. Thereafter, the first ferromagnetic film 4 and the conductive film 3 are transferred to the surface of the substratum 5 on the surface of which the strong adhesive 6 is applied as shown in FIG. 2B similarly as mentioned above. The conductive film 3 and the first ferromagnetic film 4 are divided into parallel magnetic lines 7 at regular spaces as shown in FIG. 2C. Thereafter, a second ferromagnetic film **4*b* is deposited on each of the parallel magnetic lines 7 so as to produce parallel magnetic lines 7*a* each having a series coupled magnetic-closed circuit around each of the parallel magnetic lines 7 by the first and second ferromagnetic films 4 and 4*b*** as shown in FIG. 2D.

FIG. 2E shows an example of the memory matrix plane produced in accordance with the invention but the plate of driving lines is the plate shown in FIG. 1D.

FIGS. 3A to 3D shows another example of the invention, in which the conductive film 3 and the first ferromagnetic film 4 are divided into parallel magnetic lines before the transferring, Other processes are the same as the example shown in FIGS. 2A to 2E.

In the memory matrix plane fabricated as mentioned above, the parallel magnetic lines **7*a* each having the series coupled closed-magnetic circuit are employed as digit lines, and the parallel magnetic lines 7 are employed as driving lines. In this case, the first ferromagnetic film 4 acts as a flux-keeper for magnetic fluxes generated from the corresponding one of the parallel magnetic lines 7, so that the magnetic fluxes generated from the parallel magnetic lines 7 can be effectively applied to the magnetic lines 7*a*** without mutual interference. Accordingly, it is readily possible to reduce the space between adjacent memory cells and the power consumption of driving currents.

As mentioned above, since a number of parallel driving lines with magnetic flux keepers and a number of miniaturized magnetic parallel lines each having a series coupled closed-magnetic circuit can be readily produced in the similar manner of mass production in accordance with this invention, this invention is useful to make miniaturized ferromagnetic memory matrix planes of a high bit density.

What we claim is:

1. A method for producing a memory matrix having a number of parallel conductive drive lines with magnetic flux keepers and a number of parallel magnetic plated memory lines, each of said memory lines comprising a conductive line and a ferromagnetic film deposited completely around the entire periphery of the conductive line and each of said drive lines comprising a conductive line and a ferromagnetic film deposited partially about the periphery thereof, comprising:

- a first step of depositing a first ferromagnetic film on each of a number of parallel conductive lines adhered to a flexible, insulative sheet by a solventproof adhesive so as to partially coat the periphery of said conductive lines,
- a second step of transferring the partially coated lines to the surface of a substratum on the surface of which is deposited a strong adhesive stronger than the solventproof adhesive such that the uncoated portions of said conductive lines are exposed,
- a third step of depositing a second ferromagnetic film on said uncoated portions of said conductive lines so as to produce a ferromagnetic film about the entire periphery of said conductive lines, and
- a fourth step of associating a product of the second step with a product of the third step so that the parallel lines of the two products are insulated and intersect each other at substantially 90°.

2. A method for producing a memory matrix comprising: a first step of bonding a conductive film on a flexible, insulative sheet by use of a solventproof adhesive; a second step of dividing the conductive film into parallel small lines at regular spaces; a third step of electrically plating a first ferromagnetic film on each of the parallel small lines to partially coat the periphery of said lines on the flexible, insulative sheet; a fourth step of transferring the partially coated lines to the surface of a substratum on the surface of which an adhesive stronger than the solventproof adhesive is applied such that the uncoated portions of said conductive lines are exposed; a fifth step of depositing a second ferromagnetic film on said uncoated portions of said lines so as to produce a ferromagnetic film about the entire periphery of said parallel lines by the first and second ferromagnetic films; and a sixth step of associating a product of the fourth step with a product of the fifth step so that the parallel lines of the two products are insulated and intersect each other at substantially 90°.

* * * * *